F. E. SHAFER.
DIRIGIBLE HEADLIGHT.
APPLICATION FILED SEPT. 14, 1920.
1,395,745. Patented Nov. 1, 1921.
2 SHEETS—SHEET 2.
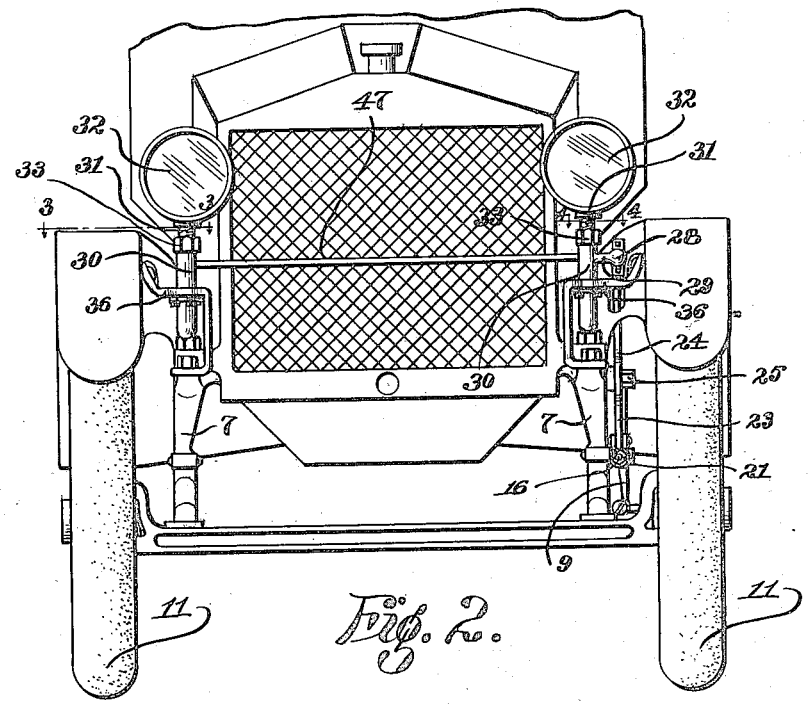
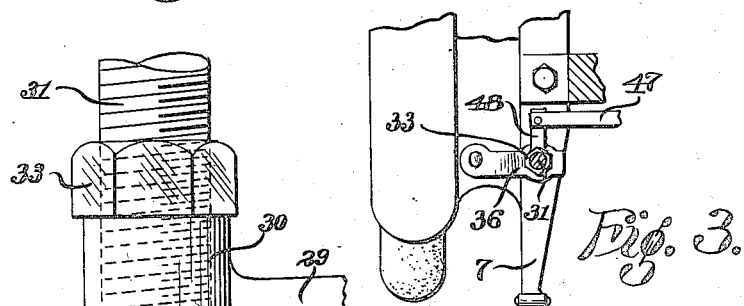
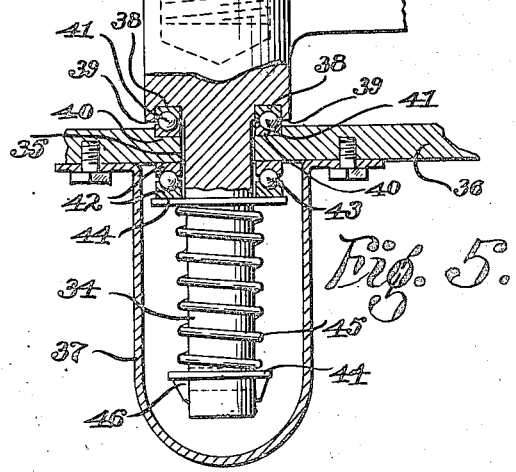
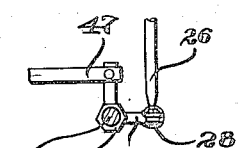
Inventor:
Fay E. Shafer,
By Hugh N. Wagner
Atty.

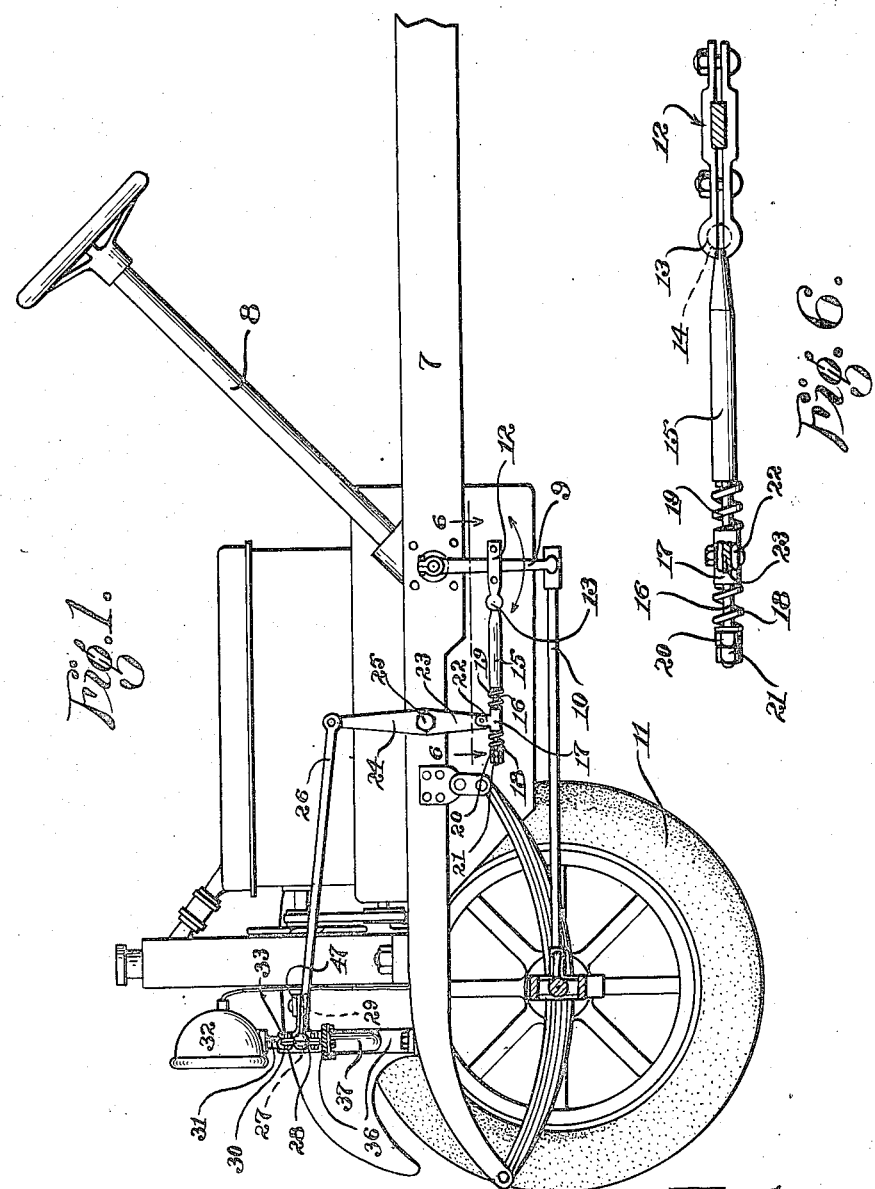

UNITED STATES PATENT OFFICE.

FAY E. SHAFER, OF ST. LOUIS, MISSOURI, ASSIGNOR TO SHAFER SAFETY AUTO POST COMPANY, OF ST. LOUIS, MISSOURI, A CORPORATION OF MISSOURI.

DIRIGIBLE HEADLIGHT.

1,395,745.　　　　Specification of Letters Patent.　　Patented Nov. 1, 1921.

Application filed September 14, 1920. Serial No. 410,305.

*To all whom it may concern:*

Be it known that I, FAY E. SHAFER, a citizen of the United States, residing at the city of St. Louis, in the State of Missouri, have invented certain new and useful Improvements in Dirigible Headlights, of which the following is a specification.

This invention relates to rotatable or dirigible headlights for automobiles and has for its object the provision of a movable headlight whose rays will follow the direction of the front wheels when the automobile is rounding a corner. Heretofore difficulty has existed in seeing the road immediately in front of the automobile, while turning a sharp curve, when the headlights are rigidly attached to the chassis of the automobile. This difficulty is overcome and the object is attained through the use of the mechanism hereinafter described.

In the accompanying drawings forming part of this specification, in which like numbers of reference denote like parts wherever they occur, Figure 1 is a side elevation of the chassis of an automobile showing the invention attached to the headlights;

Fig. 2 is a front elevation of an automobile showing the invention attached to the headlights;

Fig. 3 is a section through the headlight standard taken on the line 3—3 of Fig. 2;

Fig. 4 is a fragmental diagrammatic section through the opposite headlight standard taken on the line 4—4 of Fig. 2;

Fig. 5 is an enlarged view, part in section and part in full, of the mounting of the rotatable headlights; and Fig. 6 is a sectional view taken on the line 6—6 of Fig. 1 showing the connection between the rotatable headlights and the steering mechanism of the automobile.

In Fig. 1 the numeral 7 indicates the chassis of an automobile with the steering column 8 connected in the usual manner to the guiding arm 9 and the drag-link 10 to the front wheels 11. Around the guiding arm 9 which swings back and forth as indicated by the arrow, a split clamp 12 is bolted, one end of which is widened out to form a socket 13 for the ball 14 on the end of the lower connecting link 15. This link 15 has a reduced end portion 16 upon which rides a sleeve or sliding collar 17 yieldingly and slidably held between two coil springs 18 and 19 wound about the reduced portion 16. The tension of these springs 18 and 19 is regulated by the adjusting nut 20 and corresponding lock nut 21. The purpose of these buffer springs will be explained later. The sliding collar 17 has an upwardly extending fork 22 into which is pivoted the end 23 of a vertically pivoted arm 24. This arm is pivoted at 25 to any convenient rigid portion of the car, in this case it will be pivoted to the chassis 7. The upper end of this arm 24 is also pivotally connected to the upper connecting rod 26. The forward end of this rod terminates in a ball 27 (shown dotted in Figs. 1 and 4) and is surrounded by the socket 28 on the end of arm 29, this arm 29 being rigidly fastened on one of the standards 30. These standards 30 are threaded interiorly on their upper ends to receive the bolts 31 that support the headlights 32. The headlights 32 are adjustable up and down and are held in position by the lock nuts 33. The lower ends of the standards 30 have reduced portions 34 extending through holes 35 in supporting brackets 36. The lower portions of the brackets 36 are fastened rigidly to the chassis of the automobile and are bent so as to form horizontal portions through which the holes 35 are drilled and upon which the protecting caps 37 may be bolted (see Figs. 2 and 5). The other ends of these brackets 36 are attached to the fenders of the automobile.

The standard 30 has a bearing race 38 pressed into the shoulder 39, the other race 40 being pressed into an annular recess cut around the top of the hole 35. Between the two races 38 and 40 are the balls 41. On the under side of the bracket 36 are corresponding races 42 with their balls 43. These races 42 are held firmly in place by the washers 44 and the coil spring 45 wound about the reduced portion 34 of the bracket 30, while the lower end of the spring 45 is held by the self-locking key 46. This spring 45 causes the supporting bracket 30 to be resiliently held against any undue vibration or rotary motion and also serves to keep the friction-reducing bearings in position.

The reduced portion 34, the spring 45 and bearings 42 are protected from the weather by the cap 37 which is bolted to the bracket 36. The two lights are connected together by the connecting rod 47, which is pivoted to the arm 48 extending out from the standards 30 at right angles to the arm 29.

The mode of operation of this invention will now be described: When the guiding arm 9 is moved back as it would be in guiding the car to the right it carries the connecting link 15 back with it, the connecting link 15 riding on the ball and socket joint 13 and supported on the other end by the pivoted arm 24.

The opposed springs 18 and 19 acting on the slidably mounted sleeve tend to reduce to a minimum any vibration or shock that may be transmitted from the road through the wheels and guiding arm 9, but when the guiding arm 9 is moved back sufficiently to change the course of the automobile the buffing action of these springs 18 and 19 is obviated and the lower end 23 of the pivoted arm 24 moves back parallel with the guiding arm 9. This action throws the upper end of the arm 23 forward, this in turn moves the upper connecting link 26 forward and turns the standard 30 to the right, the connecting link 26 being connected to the standard 30 by the arm 29 mounted on the standard 30 and the ball and socket joint 28. The headlights 32 move in conjunction with the standards 30 and are connected together by the link 47 and the arms 48 so that the arms 48 are always parallel. When the turn has been covered and the wheels 11 straightened out with respect to the chassis 7 of the automobile the motions previously described are reversed and the headlights assume their normal position, that is, direct to the front of the automobile. Also, when it is desired to turn the automobile to the left the arm 9 moves forward and the headlights move to the left through their connections to this arm 9.

Having thus described this invention, I hereby reserve the benefit of all changes in form, arrangement, order, or use of parts, as it is evident that many minor changes may be made therein without departing from the spirit of this invention or the scope of the following claims.

I claim:

1. In an automobile light adjuster, the combination of rotating lights, standards for said lights, arms extending at a right angle from said standards, a link pivoted to said arms, an arm extending horizontally out to the side of the automobile from one of said standards, a vertically-pivoted arm, a connecting rod joining the aforementioned arm to said vertically-pivoted arm, a link connecting said vertically-pivoted arm to the conventional guide-rod of the ordinary automobile steering apparatus, a reduced portion on said link, a guide sleeve for said link, said sleeve being pivoted on the lower end of the aforesaid vertically-pivoted arm, springs coiled about the reduced portion and on each side of the sleeve, means for causing the springs to re-act upon the sleeve in the form of a shoulder on one side and a nut and its locking nut on the other side, a ball formed on one end of the link, said ball fitting into a socket, said socket being a portion of a split clamping member of the guiding arm.

2. In combination with the steering apparatus of a motor vehicle embodying a guide arm, a clamp detachably mounted on said arm and having one end thereof formed to provide a socket, a link, one end of which is formed to provide a ball for engagement in the socket, and the opposite end reduced, a collar yieldingly mounted on the reduced end of said link, a pivoted arm one end of which is pivotally connected to said collar, and a connecting rod having one end pivoted to the free end of said arm and the opposite end adapted for engagement with the automobile headlight.

In testimony whereof I hereunto affix my signature.

FAY E. SHAFER.